United States Patent
Kim et al.

(10) Patent No.: US 12,077,231 B2
(45) Date of Patent: Sep. 3, 2024

(54) APPARATUS AND METHOD FOR CONTROLLING STEER-BY-WIRE SYSTEM TO PROVIDE IMPROVED FEEDBACK TO STEERING WHEEL

(71) Applicant: HL MANDO CORPORATION, Gyeonggi-do (KR)

(72) Inventors: Seong Joo Kim, Bay City, MI (US); Ramakrishnan Rajavenkitasubramony, Bay City, MI (US); Tony Dodak, Bay City, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 393 days.

(21) Appl. No.: 17/180,717

(22) Filed: Feb. 19, 2021

(65) Prior Publication Data
US 2022/0266901 A1    Aug. 25, 2022

(51) Int. Cl.
| | |
|---|---|
| B62D 5/04 | (2006.01) |
| B62D 5/00 | (2006.01) |
| B62D 6/00 | (2006.01) |
| B62D 6/02 | (2006.01) |
| B62D 6/06 | (2006.01) |
| B62D 6/08 | (2006.01) |

(52) U.S. Cl.
CPC .......... B62D 6/008 (2013.01); B62D 5/006 (2013.01); B62D 5/0481 (2013.01)

(58) Field of Classification Search
None
See application file for complete search history.

(56) References Cited

U.S. PATENT DOCUMENTS

| | | | | |
|---|---|---|---|---|
| 2009/0112406 A1* | 4/2009 | Fujii | ........... | B62D 5/0463 701/42 |
| 2013/0197757 A1* | 8/2013 | Ellis | ........... | B62D 6/007 701/41 |
| 2018/0111642 A1* | 4/2018 | Endo | ........... | B62D 6/008 |
| 2019/0047618 A1 | 2/2019 | Hultén | | |
| 2019/0359252 A1* | 11/2019 | Yu | ........... | G06F 17/142 |
| 2020/0023892 A1* | 1/2020 | Hong | ........... | B62D 5/0469 |

FOREIGN PATENT DOCUMENTS

KR    10-2016-0092226    8/2016

* cited by examiner

*Primary Examiner* — Angela Y Ortiz
*Assistant Examiner* — Laura E Linhardt
(74) *Attorney, Agent, or Firm* — Womble Bond Dickinson (US) LLP (57) ABSTRACT

A steer-by-wire system can be controlled using a hypothetical or virtual model of a conventional automotive steering system such as an electric power steering (EPS) system in which a steering wheel is mechanically linked to one or more road wheels. The model of the EPS system may be implemented in algorithms or instructions of software. In order to reconstruct driving feedback similar to the conventional steering system in the steer-by-wire system, the steer-by wire system may use the model of the EPS system. For example, a controller of the steer-by-wire system controls an angular velocity of a steering feedback actuator of the steer-by-wire system operably connected with the steering wheel so as to provide a steering feedback to a driver or operator using the model of the EPS system.

20 Claims, 4 Drawing Sheets

APPARATUS AND METHOD FOR CONTROLLING STEER-BY-WIRE SYSTEM TO PROVIDE IMPROVED FEEDBACK TO STEERING WHEEL

BACKGROUND

Various embodiments of the present disclosure generally relate to a steering system for a vehicle and more particularly to an apparatus and method for controlling a steer-by-wire system.

Vehicles require a steering system to control the direction of travel. Previously, mechanical steering systems have been used. The mechanical steering systems typically include a mechanical linkage or a mechanical connection between a steering wheel and vehicle's road wheels. For example, in a conventional steering system, which consists of a steering wheel, a steering column, a power assisted rack and pinion system, and tie rods, the driver turns the steering wheel which, through the various mechanical components, causes the road wheels of the vehicle to turn. Thus, movement of the steering wheel causes a corresponding movement of the road wheels. Movement of such mechanical systems is often power assisted through the use of hydraulic assists or electric motors.

The mechanical steering systems are expected to be replaced or supplemented by electrically driven steering systems, commonly known as "steer-by-wire" systems. Such steer-by-wire systems to varying extents replace, for example, the mechanical linkage between the steering wheel and the road wheels with one or more sensors, actuators and electronics. The steer-by-wire system aims to eliminate physical or mechanical connection between the steering wheel and vehicle wheels, and to change the direction of the vehicle wheels and provide feedback to a driver by using electrically controlled motors. Even though the mechanical linkage between the steering wheel and the road wheels has been eliminated, the steer-by-wire system is expected not only to produce the same functions and steering feel as a conventional mechanically linked steering system, but it is also expected to implement advanced steering system features. Requirements for conventional steering functions and advanced steering features such as adjustable steering feel can be implemented by an advanced control system design.

With the steer-by-wire system, since the mechanical link between the steering wheel and the road wheels is eliminated, some potential problems arise when trying to get the system to have the right feel e.g., tactile feedback to the driver. At the same time, since there is no longer a mechanical connection, what the driver feels at the steering wheel is highly tunable. One issue with the elimination of the mechanical connection is that the relationship between the driver's steering wheel input and the feedback felt by the driver can change significantly. This change can cause the system to have poor steering feel and may have a destabilizing effect on the system.

In a general steering system, when a vehicle's driver turns the steering wheel, the steering wheel turns first and then the road wheels follow the turning of the steering wheel. And, in contrast, when the vehicle's driver releases or does not hold the steering wheel, the road wheels turn first by the force applied to the road wheels and then the steering wheel follows the rotation of the road wheels. In the steer-by-wire system, because basically the road wheels are controlled by control signals generated responsive to the input of the steering wheel, the steer-by-wire system may have a return control returning the steering wheel to a center and generating a rotating torque to provide the steering feel for the driver when the driver removes his hand from the steering wheel. For example, the rotating torque is calculated based on a speed of the vehicle and a steering angle by using a map, a weight factor is calculated in inverse proportion to a torque that the driver applies to the steering wheel, and a current provided to a motor generating the steering feel for the steering wheel is calculated by multiplying the rotating torque by the weight factor. This approach results in driver steering wheel position and the resulting torque felt by the driver being uncomfortable and unnatural.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

Various exemplary embodiments of the present disclosure may control a steer-by-wire system using a hypothetical or virtual model of a conventional automotive steering system such as an electric power steering (EPS) system in which a steering wheel is mechanically linked to one or more road wheels. The model of the EPS system may be implemented in algorithms or instructions of software. In order to reconstruct driving feedback similar to the conventional steering system in the steer-by-wire system, the steer-by wire system may use the model of the EPS system. For example, a controller of the steer-by-wire system controls a steering feedback actuator of the steer-by-wire system operably connected with the steering wheel so as to provide a steering feedback to a driver or operator using the model of the EPS system.

According to some exemplary embodiments of the present disclosure, a vehicle steer-by-wire system may comprise: a steering torque sensor configured to sense a steering torque applied to a steering wheel; a steering feedback actuator operably connected with the steering wheel, the steering feedback actuator configured to generate a torque for a steering feedback to the steering wheel; a road wheel actuator operably connected with one or more road wheels through a rack, the road wheel actuator configured to generate a torque for rotating the one or more road wheels; and a controller configured to calculate an angular velocity of the steering feedback provided to the steering wheel of the steer-by-wire system using a model of a hypothetical steering system that has a mechanical linkage between the steering wheel and the one or more road wheels and a motor operably coupled with the mechanical linkage, and control the steering feedback actuator of the steer-by-wire system based on the angular velocity of the steering wheel calculated based on the model of the hypothetical steering system that has the mechanical linkage between the steering wheel and the one or more road wheels and the motor operably coupled with the mechanical linkage, wherein the controller calculates the angular velocity of the steering wheel of the steer-by-wire system by estimating, a rack force and a torque of the motor of the model of the hypothetical steering system, and calculating the angular velocity of the steering wheel of the steer-by-wire system based OR the rack force, the torque of the motor of the model of the hypothetical steering system, and the steering torque sensed by the steering torque sensor.

The hypothetical steering system that has the mechanical linkage between the steering wheel and the one or more road wheels and the motor operably coupled with the mechanical linkage may be an Electric Power Steering (EPS) system, and the controller may be configured to calculate the angular velocity of the steering feedback, provided to the steering wheel of the steer-by-wire system, using a model of the EPS system.

The controller may be further configured to: calculate an equivalent inertia of the model of the EPS system and an equivalent damping of the model of the EPS system; and calculate the angular velocity of the steering feedback provided to the steering wheel of the steer-by-wire system based on the equivalent moment of inertia of the model of the EPS system, the equivalent damping of the model of the EPS system, the rack force, the torque of the motor of the model of the EPS system, and the steering torque sensed by the steering torque sensor.

The controller may be configured to calculate the angular velocity of the steering feedback provided to the steering wheel of the steer-by-wire system using the model of the EPS system according to an equation:

$$J_{eq}\ddot{\theta} + B_{eq}\dot{\theta} + T_{driver} + T_{friction} + T_{motor} * N_{motor} * \eta_{gear} = F_{rack} * \left(\frac{L_{rack}}{2\pi}\right) * \eta_{rack}$$

where θ is the angular velocity of the steering feedback provided to the steering wheel, $J_{eq}$ is an equivalent inertia of the model of the EPS system, $B_{eq}$ is an equivalent damping of the model of the EPS system, $T_{driver}$ is the steering torque applied to the steering wheel, $T_{friction}$ is an equivalent friction of the model the EPS system, $T_{motor}$ is the torque of the motor of the model of the EPS system, $N_{motor}$ is a gear ratio of a gear assembly associated with the motor of the model of the EPS system, $\eta_{gear}$ is a gear efficiency of the gear assembly associated with the motor of the model of the EPS system, $F_{rack}$ is the rack force, $L_{rack}$ is a gear ratio of a rack and a pinion, and $\eta_{gear}$ is a gear efficiency of the rack and the pinion.

The controller may be configured to calculate the equivalent inertia of the model of the EPS system based on an inertia of the steering wheel, an inertia of the motor of the model of the EPS system, and an inertia of the rack.

The controller may be configured to calculate the equivalent inertia of the model of the EPS system by using an equation:

$$J_{eq} = J_{sw} + J_{motor} * N_{motor}^2 + J_{rack} * \left(\frac{L_{rack}}{2\pi}\right)^2$$

where $J_{eq}$ is the equivalent inertia of the model of the EPS system, $J_{sw}$ is an inertia of the steering wheel, $J_{motor}$ is an inertia of the motor of the model of the EPS system, $N_{motor}$ is the gear ratio of the gear assembly associated with the motor of the model of the EPS system, $J_{rack}$ is an inertia of the rack, and $L_{rack}$ is the gear ratio of We rack and the pinion.

The controller may be configured to calculate the equivalent damping of the model of the EPS system based on a damping of the steering wheel, a damping of the motor of the model of the EPS system, and a damping of the rack.

The controller may be configured to calculate the equivalent damping of the model of the EPS system by using an equation:

$$B_{eq} = B_{sw} + B_{motor} * N_{motor}^2 + B_{rack} * \left(\frac{L_{rack}}{2\pi}\right)^2$$

where $B_{eq}$ is the equivalent damping of the model of the EPS system, $B_{sw}$ is a damping of the steering wheel, $B_{motor}$ is a damping of the motor of the model of the EPS system, $N_{motor}$ is the gear ratio of We gear assembly associated with We motor of the model of the EPS system, $B_{rack}$ is a damping of the rack, and $L_{rack}$ is the gear ratio of the rack and the pinion.

The equivalent friction of the model of the EPS system may be one of constants, each constant corresponding to a respective direction of rotation of the steering wheel.

The controller may be configured to calculate the torque of the motor of the model of the EPS system based on a current supplied to the motor.

According to certain exemplary embodiments of the present disclosure, a method for controlling a vehicle steer-by-wire system may comprise: sensing, by a steering torque sensor, a steering torque applied to a steering wheel; providing, by a steering feedback actuator operably connected with the steering wheel, a torque for a steering feedback to the steering wheel; generating, by a road wheel actuator operably connected with one or more road wheels through a rack, torque for rotating the one or more road wheels; calculating an angular velocity of the steering feedback provided to the steering wheel of the steer-by-wire system using a model of a hypothetical steering system that has a mechanical linkage between the steering wheel and the one or more road wheels and a motor operably coupled with the mechanical linkage, wherein the calculating of the angular velocity of the steering feedback provided to the steering wheel of the steer-by-wire system comprises estimating a rack force and a torque of the motor of the model of the hypothetical steering system, and calculating the angular velocity of the steering wheel of the steer-by-wire system based on the rack force, the torque of the motor of the model of the hypothetical steering system, and the steering torque sensed by the steering torque sensor; and controlling the steering feedback actuator of the steer-by-wire system based on the angular velocity of the steering wheel calculated based on the model of the hypothetical steering system that has the mechanical linkage between the steering wheel and the one or more road wheels and the motor operably coupled with the mechanical linkage.

The hypothetical steering system that has the mechanical linkage between the steering wheel and the one or more road wheels and the motor operably coupled with the mechanical linkage may be an Electric Power Steering (EPS) system, and the calculating of the angular velocity of the steering feedback provided to the steering wheel of the steer-by-wire system may comprise calculating the angular velocity of the steering feedback, provided to the steering wheel of the steer-by-wire system, using a model of the EPS system.

The calculating of the angular velocity of the steering feedback provided to the steering wheel of the steer-by-wire system may comprise: calculating an equivalent inertia of the model of the EPS system and an equivalent damping of the model We EPS system; and calculating the angular velocity of the steering feedback provided to the steering wheel based on the equivalent moment of inertia of the model of the EPS system, the equivalent damping of the model of the EPS system, the rack force, the torque of the motor of the model of the EPS system, and the steering torque sensed by the steering torque sensor.

The calculating of the angular velocity of We steering feedback provided to the steering wheel of the steer-by-wire system may comprise calculating the angular velocity of the steering feedback provided to We steering wheel of the steer-by-wire system using the model of the EPS system according to an equation:

$$J_{eq}\ddot{\theta} + B_{eq}\dot{\theta} + T_{driver} + T_{friction} + T_{motor} * N_{motor} * \eta_{gear} = F_{rack} * \left(\frac{L_{rack}}{2\pi}\right) * \eta_{rack}$$

where θ is the angular velocity of the steering wheel, $J_{eq}$ is an equivalent inertia of the model of the EPS system, $B_{eq}$ is an equivalent damping of the model of the EPS system, $T_{driver}$ is the steering torque applied to the steering wheel, $T_{friction}$ is an equivalent friction of the model of the EPS system, $T_{motor}$ is the torque of the motor of the model of the EPS system, $N_{motor}$ is a gear ratio of a gear assembly associated with the motor of the model of the EPS system, is a $\eta_{gear}$ is a gear efficiency of the gear assembly associated with the motor of the model of the EPS system, $F_{rack}$ is the rack force, $L_{rack}$ is a gear ratio of a rack and a pinion, and $\eta_{gear}$ is a gear efficiency of the rack and the pinion.

The equivalent inertia of the model of the UPS system may be calculated based on an inertia of the steering wheel, an inertia of the motor of the model of the EPS system, and an inertia of the rack.

The equivalent inertia of the model of the EPS system may be calculated by using an equation:

$$J_{eq} = J_{sw} + J_{motor} * N_{motor}^2 + J_{rack} * \left(\frac{L_{rack}}{2\pi}\right)^2$$

Where $J_{eq}$ is the equivalent inertia of the model of the EPS system, $J_{sw}$ is an inertia of the steering wheel, $J_{motor}$ is an inertia of the motor of the model of the EPS system, $N_{motor}$ is the gear ratio of the gear assembly associated with the motor of the model of the EPS system, $J_{rack}$ is an inertia of the rack, and $L_{rack}$ is the gear ratio of the rack and the pinion.

The equivalent damping of the model of the EPS system may be calculated based on a damping of the steering wheel, a damping of the motor of the model of the EPS system, and a damping of the rack.

The equivalent damping of the model of the EPS system may be calculated by using an equation:

$$B_{eq} = B_{sw} + B_{motor} * N_{motor}^2 + B_{rack} * \left(\frac{L_{rack}}{2\pi}\right)^2$$

where $B_{eq}$ is the equivalent damping of the model of the EPS system, $B_{sw}$ is a damping of the steering wheel, $B_{motor}$ is a damping of the motor of the model of the EPS system, $N_{motor}$ is the gear ratio of the gear assembly associated with the motor of the model of the EPS system, $B_{rack}$ is a damping of the rack, and $L_{rack}$ is the gear ratio of the rack and the pinion.

The equivalent friction of the model of the EPS system may be one of constants, each constant corresponding to a respective direction of rotation of the steering wheel.

The method for controlling the vehicle steer-by-wire system may further comprise calculating the toque of the motor of the model of the EPS system based on a current supplied to the motor of the model of the hypothetical steering system.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
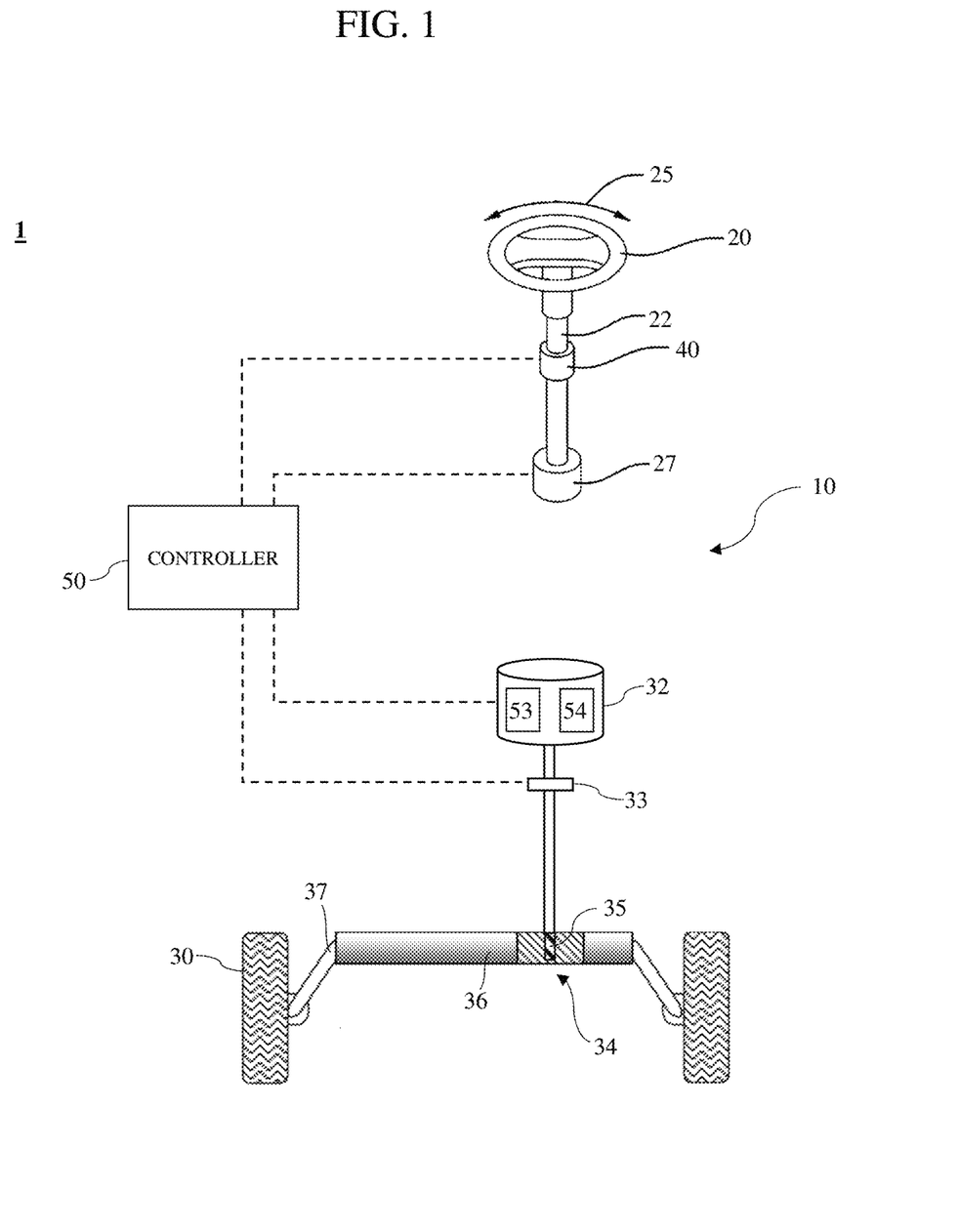
FIG. 1 is a schematic view of a vehicle including a steer-by-wire system according to an exemplary embodiment of the present disclosure.

Referring now to FIG. 1, a steer-by-wire system 10 for use in a vehicle 1 is illustrated. In a conventional automotive steering system such as an electric power steering (EPS) system, a steering wheel is mechanically linked to one or more road wheels (e.g. front road wheels). However, the steer-by-wire system 10 according to the present disclosure removes this mechanical connection and instead, electronically controls a steering angle of the road wheels 30 based on measurement of a steering wheel or hand wheel 20 and provides feedback to a driver or operator of the vehicle 1 using a plurality of actuators such as electric motors.

Figure 4:
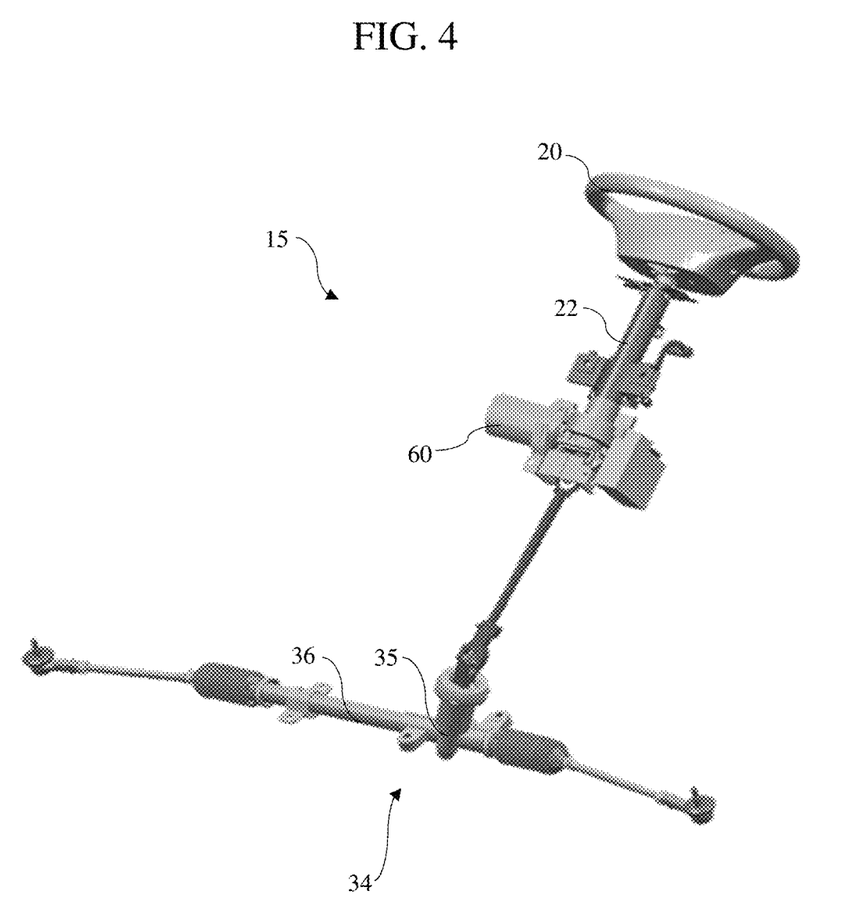
FIG. 4 shows a schematic view of an electronic power steering (EPS) system.

Some exemplary embodiments of the present disclosure may control the steer-by-wire system 10 using a model of the EPS system in which a steering wheel is mechanically linked to one or more road wheels. Referring to FIG. 4, there is shown a schematic diagram of an exemplary EPS system 15. The EPS system 15 works to supplement the manual steering contribution of a driver or operator in order to decrease the effort required to change the trajectory of the vehicle 1 by applying additional torque to one or more components of a steering system using an electronic steering motor 60. For example, an electric motor 60 may be coupled to a steering shaft 22. Alternatively, a steering motor 60 can be coupled to the rack-and-pinion gear set 34 to provide additional torque to the rack-and-pinion gear set 34 to assist the driver or operator in steering the vehicle 1. Actuation of the electronic steering motor 60 can be controlled by a controller and based on data from one or more sensors including the position of the steering column and the manual torque provided by the driver.

In the steer-by-wire system 10 of FIG. 1, the model of the EPS system 15 of FIG. 4 may be a hypothetical or virtual model implemented in algorithms or instructions of software. The steer-by-wire system 10 is mechanically different from the EPS system 15. However, in order to reconstruct driving feedback of the conventional steering system in the steer-by-wire system 10, the steer-by wire system 10 may use the model of the EPS system 15. For example, a controller 50 of the steer-by-wire system 10 of FIG. 1 controls a steering feedback actuator 27 so as to provide a steering feedback like steering feeling of the EPS system 15 of FIG. 4 to the driver or operator using the model of the EPS system 15. Exemplary embodiments of the steer-by-wire system 10 using the model of the EPS system 15 will be described hereinafter.

The steer-by-wire system 10 allows the driver or operator of the vehicle 1 to control the direction of the vehicle 1 or road wheels 30 of the vehicle 1 through the manipulation of the steering wheel 20. The steering wheel 20 is operatively or mechanically coupled or fixed to a steering shaft (or steering column) 22. The steering wheel 20 may be directly or indirectly connected with the steering shaft 22. For example, the steering wheel 20 may be connected to the steering shaft 22 through a gear, a shaft, a belt and/or any connection means. Alternatively, the steering wheel 20 may be fixed to the steering shaft 22. The steering shaft 22 may be rotatable together with the steering wheel 20.

One or more steering wheel sensors 40 may be configured to detect position, angular displacement or travel 25 of the steering shaft 22 or steering wheel 20, as well as detect the torque of the angular displacement or travel 25 of the steering shaft 22 or steering wheel 20. The steering wheel sensor 40 provides electric signals to a controller 50 indicative of the angular displacement and/or torque 25. The controller 50 sends and/or receives signals to/from a steering feedback actuator 27 (e.g. an electric motor) to actuate the steering feedback actuator 27 in response to the angular displacement and/or torque 25 of the steering wheel 20. The steering feedback actuator 27 rotates or moves the steering wheel 20 to provide feedback to the driver or operator (similarly to the feedback provided by the wheels in a manual steering vehicle) in response to the control signals received from the controller 50.

The controller 50 also transmits signals or commands to a road wheel actuator 32. For example, the road wheel actuator 32 includes an electric motor 54 and a gear assembly 53 associated with the motor 54 to generate torque. The road wheel actuator 32 controls a rack-and-pinion 34, including pinion gear 35 and rack 36, in response to the control signals received form the controller 50. For example, the road wheel actuator 32 generates rotary motion in response to the control signals of the controller 50, the rotary motion of the road wheel actuator 32 is transferred to the rack-and-pinion 34. The pinion gear 35 converts the rotary motion into linear movement of the toothed rack 36. The tie rods 37 connect the rack 36 to road or vehicle wheels 30 and convert the movement of the rack 36 into rotation of the road wheels 30.

In use, the steering wheel 20 is angularly displaced 25 such that the steering shaft 22 can be also angularly displaced. The sensor 40 detects the angular displacement and torque 25 of the steering shaft 22 coupled with the steering wheel 20, and the sensor 40 sends signals to the controller 50 indicative of the relative amount of angular displacement and torque 25 of the steering shaft 22. The controller 50 sends control signals to the road wheel actuator 32 indicative of the relative amount of the angular displacement and/or toque of the road wheel actuator 32. In response, the road wheel actuator 32 moves the rack-and-pinion 34 so that the road wheels 30 are turned. Thus, the controller 50 controls the distance that the rack 36 is moved based on the amount of the angular displacement 25 of the steering wheel 20. Movement of the rack 36 manipulates the tie rods and knuckles to reposition the road wheels 30 of the vehicle 1. Accordingly, when the steering wheel 20 is turned, the road wheels 30 are turned.

In order to perform the prescribed functions and desired processing, as well as the computations therefore (e.g., the identification of motor parameters, control algorithm(s), and the like), the controller 50 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, the controller 50 may include input signal processing and filtering to enable accurate sampling and conversion or acquisitions of such signals from communications interfaces. Although FIG. 1 illustrates the controller 50 as a single controller, one skilled in the art would understand that the controller 50 may be distributed among a plurality of vehicle controllers.

As described above, in the steer-by-wire system 10, the steering wheel 20 may be mechanically isolated from the road wheels 30. Accordingly, the steer-by wire steering system 10 needs to provide the driver or operator with the same "road feel" that the driver receives with a direct mechanical link. Furthermore, it is desirable to have a device that provides a mechanical back up "road feel" in the event of multiple electronic failures in the steer-by-wire system. In addition, a device that provides positive on-center feel and accurate torque variation as the handwheel is rotated is also desirable. Therefore, the vehicle 1 may comprise the steering feedback actuator 27.

The steering feedback actuator 27 may comprise, for example, but no limited to, an electric motor which is connected to the steering shaft or steering column 22. For example, a gear or belt assembly may connect an output of the steering feedback actuator 27 to the steering shaft 22. Alternatively, the steering feedback actuator 27 may be directly coupled to the steering shaft 22 or the hand wheel 20. The steering feedback actuator 27 is actuatable to provide resistance to rotation of the steering wheel 20. The controller 50 is electrically coupled with the sensors 40 and to the steering feedback actuator 27. The controller 50 receives signals indicative of the applied torque and angular rotation 25 of the steering wheel 20 from the sensors 40. In response to the signals from the sensors 40, the controller 50 generates and transmits a signal corresponding to the sensed torque and angular rotation of the steering wheel 20 sensed by the sensors 40 and the steering feedback actuator 27 generates resistance torque to the rotation of the steering wheel 20 in response to the signal of the controller 50 to provide the steering feel to the driver.

In some embodiments of the present disclosure, the controller 50 may be configured to control the steering feedback actuator 27 by calculating an angular velocity of a rotary steering feedback of the steering wheel 20. The angular velocity of the rotary steering feedback of the steering wheel 20 may be calculated using a model of a hypothetical or virtual steering system that has a mechanical linkage between a steering wheel and one or more road wheels and a motor operably coupled with the mechanical linkage. The hypothetical or virtual steering system for controlling the steer-by-wire system 10 may be a conventional steering system such as the EPS system 15 shown in FIG. 4.

For example, the controller 50 of the steer-by-wire system 10 may calculate the angular velocity of the rotary steering feedback of the steering wheel 20 using a model of the EPS system. The model of the EPS system is a hypothetical or virtual model for calculating the angular velocity of the rotary steering feedback provided to the steering wheel 20 in the steer-by-wire system 10. The model of the EPS system is implemented in algorithms or instructions of software. In an exemplary embodiment of the present disclosure, the angular velocity of the rotary steering feedback provided to the steering wheel 20 may be calculated by using Equation (1):

$$J_{eq}\ddot{\theta} + B_{eq}\dot{\theta} + T_{driver} + T_{friction} + T_{motor} * N_{motor} * \eta_{gear} = F_{rack} * \frac{L}{2\pi} * \eta_{rack}$$

where θ is an angular velocity of a steering wheel, $J_{eq}$ is the equivalent inertia of an EPS system, $B_{eq}$ is an equivalent damping of the EPS system, $T_{driver}$ is a steering torque applied to the steering wheel, $T_{friction}$ is an equivalent friction of the EPS system, $T_{motor}$ is the torque of an electronic steering motor of the EPS system, $N_{motor}$ is a gear ratio of a gear assembly associated with the electronic steering motor of the EPS system, $\eta_{gear}$ is a gear efficiency of the gear assembly associated with the electronic steering motor of the EPS system, $F_{rack}$ is a rack force, L is a gear ratio of a rack and pinion, and $\eta_{gear}$ is a gear efficiency of the rack and pinion.

The rack force $F_{rack}$ may be calculated by the controller 50 in various ways. The rack force may be a force acting on the steering rack 36. The force transmitted from the tires of the road wheels 30 and/or tie rods 37 to the steering rack 36, called the rack force, significantly influences the torque experienced by the driver at the steering wheel 20. The rack force may be generated tire-road interaction forces and moments that result from tire-road angle, steering angle, vehicle speed and road profile variation such as longitudinal road slopes (road grads), lateral road slopes (road banks), side-slopes, and so on. The rack force plays an important role for steering feel which is directly related to the steering torque transferred to the steering wheel 20. The rack force $F_{rack}$ can be estimated by using various conventional models of vehicle dynamics (e.g. suspension and tire models). The controller 50 can calculate the rack force $F_{rack}$, for example, on the basis of the driving conditions of the motor vehicle. Here, for example the speed of the vehicle, lateral acceleration, yaw rate, steering angle and change in the steering angle are taken into account. In addition, disturbance torques can be caused by influences of the underlying surface such as one-sided unevenness of the ground or ruts in the underlying surface. These events are detected by a further algorithm and the deviation from the above specified reference is correspondingly compensated. For example, the controller 50 may estimate rack force $F_{rack}$ for different surfaces based on roadwheel angle and vehicle speed. In another example, the rack force $F_{rack}$ can be estimated based on motor measurements, such as motor angle and motor speed of the road wheel actuator 32. The motor angle of the road wheel actuator 32 is input to a static tire model and a rolling tire model. The static tire model predicts the rack torque based on motor position, motor velocity and vehicle speed. The rolling tire model uses a nonlinear bicycle model to predict rack torque. The rolling tire model outputs a rolling rack force and the static tire model output a static rack force, which can be combined or blended as a function of vehicle speed to produce the rack force $F_{rack}$. In still another example, the controller 50 estimate the rack force $F_{rack}$ based on at least one of signals received from a steering wheel angle sensor, a vehicle yaw rate sensor, a vehicle lateral acceleration sensor.

The steering torque $T_{driver}$ applied to the steering wheel 20 may be detected by the steering wheel sensor 40.

The equivalent inertia $J_{eq}$ of the EPS system 15 may be calculated by the controller 50. The equivalent inertia $J_{eq}$ of the EPS system 15 may mean an equivalent inertia from the steering wheel 20 to the rack and pinion 34. The equivalent inertia $J_{eq}$ of the EPS system 15 may be calculated based on, for instance, but not limited to, one or more of an inertia of the steering wheel 20, an inertia of the electronic steering motor 60 of the EPS system, and an inertia of the rack bar 36. For example, the equivalent inertia $J_{eq}$ of the EPS system 15 may be calculated by using Equation (2):

$$J_{eq} = J_{sw} + J_{motor} * N_{motor}^2 + J_{rack} * \left(\frac{L_{rack}}{2\pi}\right)^2$$

where $J_{eq}$ is an equivalent inertia of an EPS system, $J_{sw}$ is an inertia of a steering wheel, $J_{motor}$ is an inertia of an electronic steering motor of the EPS system, $N_{motor}$ is a gear ratio of a gear assembly associated with the electronic steering motor of the EPS system, $J_{rack}$ is an inertia of a rack bar, and $L_{rack}$ is a gear ratio of a rack and pinion.

The equivalent damping $B_{eq}$ of the EPS system mar be calculated based on a damping of the steering wheel 20, a damping of the electronic steering motor 60 of the EPS system, and a damping of the rack bar 30. For example, the equivalent damping $B_{eq}$ of the EPS system may be calculated by using Equation (3):

$$B_{eq} = B_{sw} + B_{motor} * N_{motor}^2 + B_{rack} * \left(\frac{L_{rack}}{2\pi}\right)^2$$

where $B_{eq}$ is an equivalent damping of an EPS system, $B_{sw}$ is a damping of a steering wheel, $B_{motor}$ is a damping of an electronic steering motor of the EPS system, $N_{motor}$ is a gear ratio of a gear assembly associated with the electronic steering motor of the EPS system, $B_{rack}$ is a damping of a rack bar, and $L_{rack}$ is a gear ratio of a rack and pinion.

The equivalent friction $T_{friction}$ of the EPS system 15 may be one of constants, preset values, stored in memory of the controller 50. For example, the controller 50 stores a plurality of preset constants, each constant corresponding to a respective direction of rotation of the steering wheel 30, and selects one of the constants based on the direction of rotation of the steering wheel 30 sensed by the steering wheel sensor 40.

The torque $T_{motor}$ of the electronic steering motor 60 of the EPS system 15 may be calculated based on a current of the electronic steering motor 60 of the EPS system 15. For example, the torque $T_{motor}$ of the electronic steering motor 60 of the EPS system 15 is directly proportion to the current of the electronic steering motor 60 of the EPS system 15. The current of the electronic steering motor 60 of the EPS system 15 may be calculated based OR one or more of a rotational position or torque of the steering wheel 30 sensed by the steering wheel sensor 40, the speed of the vehicle 1, and/or the position of the road wheels 30.

The gear ratio $N_{motor}$ of the gear assembly 53 associated with the electronic steering motor 60 of the EPS system 15 and a gear efficiency $\eta_{gear}$ of the gear assembly 53 associated with the electronic steering motor 60 of the EPS system 15 may be constants, preset values, stored in the memory of the controller 50.

The gear ratio $L_{rack}$ of the rack and pinion 34 and the gear efficiency $\eta_{gear}$ of the rack and pinion 34 may be constants, preset values, stored in the memory of the controller 50.

Therefore, the controller 50 of the steer-by-wire system 10 may calculate the angular velocity θ of the rotary steering feedback provided to the steering wheel 20 of the steer-by-wire system 10 using Equation (1) above which is an exemplary embodiment of the model of the EPS system.

The controller 50 may control the steering feedback actuator 27 based on the angular velocity θ of the steering feedback calculated using Equation (1) to provide the steering feedback to the steering wheel 20.

Figure 2:
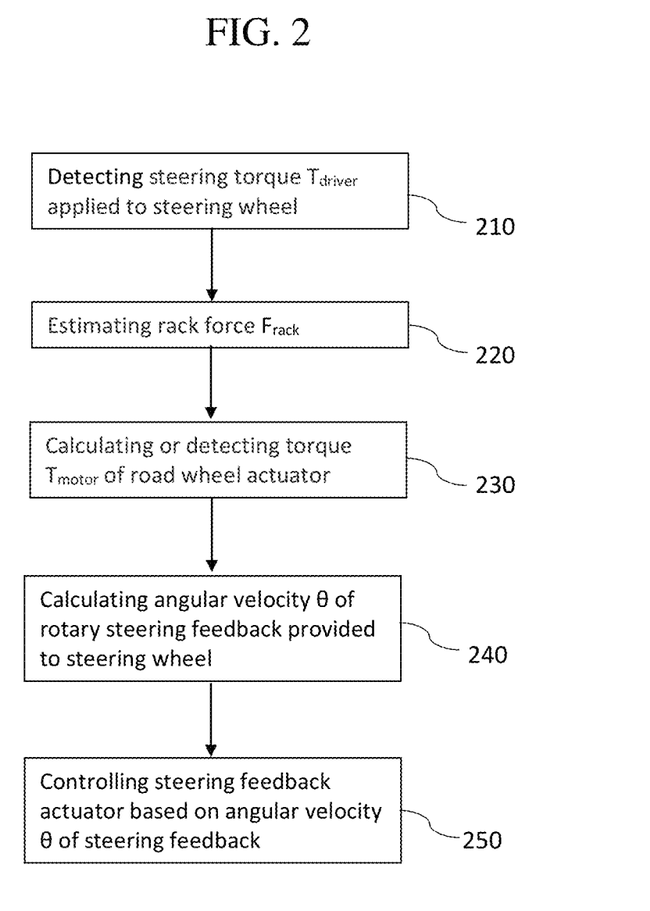
FIG. 2 is a flow diagram of a method for controlling a steer-by-wire system according an exemplary embodiment of the present disclosure.

FIG. 2 is a flow diagram of a method for controlling a steer-by-wire system using a hypothetical or virtual model of a conventional steering system according an exemplary embodiment of the present disclosure.

At step 210, the steering wheel sensor 40 detects the steering torque $T_{driver}$ applied to the steering wheel 20. At step 220, the controller 50 estimates the rack force $F_{rack}$.

At step 230, the torque $T_{motor}$ of the electronic steering motor 60 of the model of the EPS system 150 is calculated by the controller 50. For example, the torque $T_{motor}$ of the electronic steering motor 60 of the model of the EPS system 150 may be calculated using a current of the electronic steering motor 60 of the model of the EPS system 150. The torque $T_{motor}$ of the electronic steering motor 60 of the model of the UPS system 150 may be substantially proportional to the current of the electronic steering motor 60 of the model of the EPS system 150. The current of the electronic steering motor 60 of the model of the EPS system 15 may be calculated based on one or more of a rotational position or torque of the steering wheel 30 sensed by the steering wheel sensor 40, the speed of the vehicle 1, and/or the position of the road wheels 30.

Steps 210 to 230 do not need to be performed in order. The order of steps 210 to 230 may be changed or may be performed simultaneously.

At step 240, the controller 50 calculates the angular velocity θ of the rotary steering feedback provided to the steering wheel 20 based on one or more of the steering torque $T_{driver}$ applied to the steering wheel 20, the rack force $F_{rack}$ estimated by the controller 50, and the torque $T_{motor}$ of the model of the EPS system 15. For example, Equation (1) provided above can be used in order to calculate the angular velocity θ of the rotary steering feedback provided to the steering wheel 20.

At step 250, the controller 50 controls the steering feedback actuator 27 of the steer-by-wire system 10 based on the angular velocity θ of the steering feedback calculated at step 240 to provide the steering feedback to the steering wheel 20

In some embodiments of the present disclosure, by controlling the steering feedback actuator 27 of the steer-by-wire system 10 in response to the angular velocity of the steering feedback calculated using a model of a hypothetical or virtual conventional steering system, such as the EPS system, in which a steering wheel is mechanically linked to one or more road wheels (for example, Equation (1)), the steering feedback of the steering wheel 20 provided to the driver or operator may be improved so that the driver or operator can feel the steering feedback of the steering wheel 20 provided by the steering feedback actuator 27 natural and comfortable, and the steering feedback actuator 27 may be controlled with faster processing time and speed and smaller processing resources requirements. Further, the time for tuning restoration performance of the steering feedback of the steering wheel 20 may be reduced. Even when the driver releases hands from the steering wheel 20, the steering feedback actuator 27 may provide more natural steering feedback to the driver by reflecting a movement feature generated by the change of actually applied force when controlling the steering feedback actuator 27. The controller 50 basically controls the steering feedback actuator 27 of the steer-by-wire system 10 by a model of a hypothetical or virtual conventional steering system, such as the EPS system, in which a steering wheel is mechanically linked to one or more road wheels, and therefore the restoration speed may be improved and the controller 50 does not need an additional logic for the change of a road surface because the change of the restoration force of a tire is reflected in the rack force even when the vehicle 1 is driving on a low-mu road surface. Various embodiments of the present disclosure may simplify the control of steering feedback, enable tunable steering feel, and improve advanced vehicle control.

Figure 3:
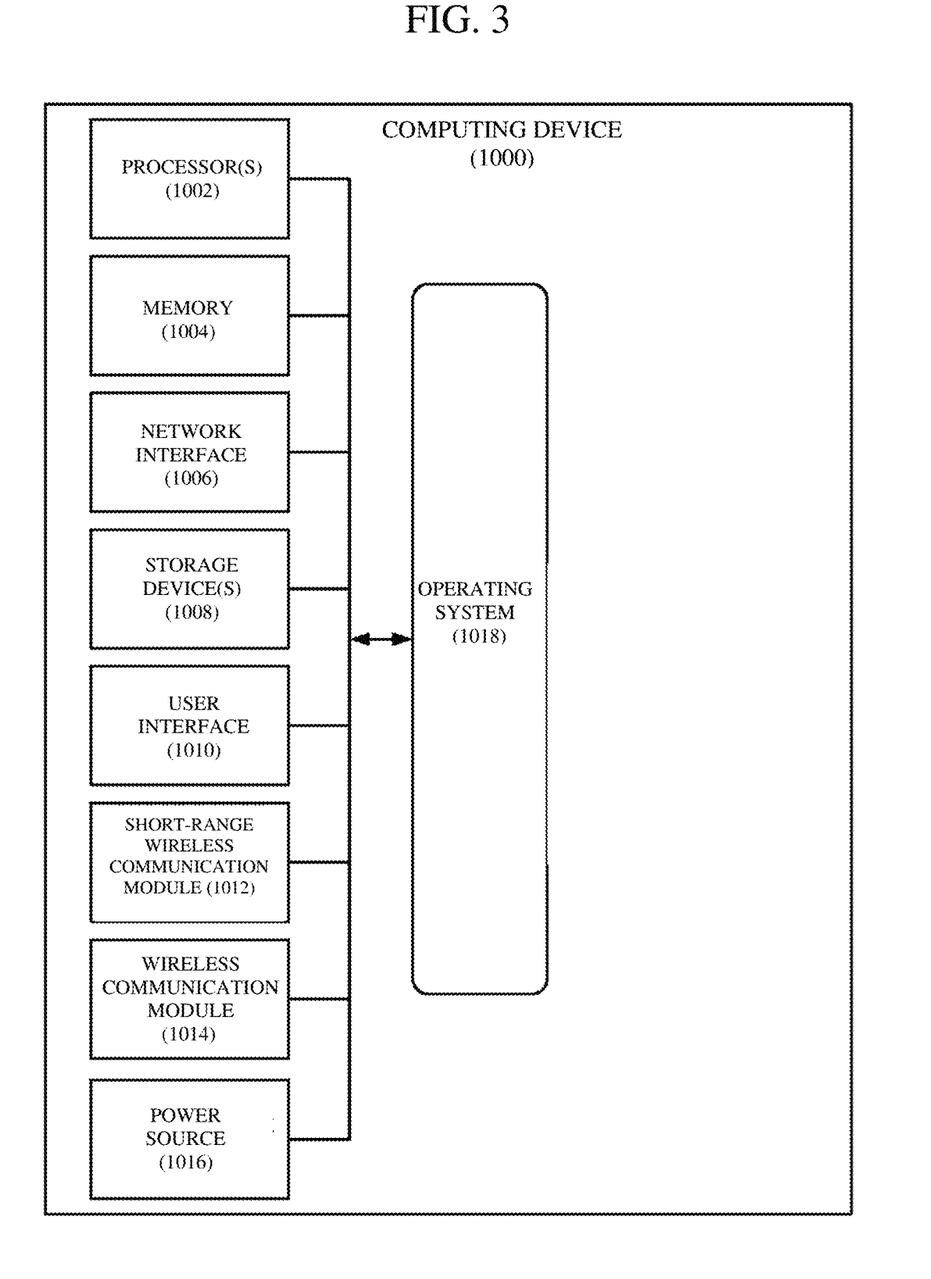
FIG. 3 shows a block diagram of a controller included in a steer-by-wire system according to an exemplary embodiment t of the present disclosure.

FIG. 3 shows a block diagram illustrating components of an example computing device, such as the controller 50 shown in FIG. 1. FIG. 3 illustrates only one particular example of the controller 50, and many other examples of the controller 50 may be used in other instances.

As shown in the specific example of FIG. 3, a computing device 1000, such as the controller 50 shown in FIG. 1, may include one or more processors 1002, memory 1004, network interface 1006, one or more storage devices 1008, user interface 1010, short-range wireless communication module 1012, wireless communication module 1014, and power source 1016. Computing device 1000 may also include operating system 1018, which may include modules and/or applications that are executable by one or more processors 1002 and computing device 1000. Each of the components 1002, 1004, 1006, 1008, 1010, 1012, 1014, 1016, and 1018 may be interconnected (physically, communicatively, and/or operatively) for inter-component communications.

One or more processors 1002, in one example, may be configured to implement functionality and/or process instructions for execution within computing device 1000. For example, one or more processors 1002 may be capable of processing instructions stored in memory 304 or instructions stored on one or more storage devices 1008. These instructions may define or otherwise control the operation of operating system 1018.

Memory 1004 may, in one example, be configured to store information within computing device 1000 during operation. Memory 1004, in some examples, may be described as a computer-readable storage medium. In some examples, memory 1004 may be a temporary memory, meaning that a primary purpose of memory 1004 is not long-term storage. Memory 1004 may, in some examples, be described as a volatile memory, meaning that memory 1004 does not maintain stored contents when computing device 1000 is turned off. Examples of volatile memories may include random access memories (RAM), dynamic random access memories (DRAM), static random access memories (SRAM), and other forms of volatile memories known in the art. In some examples, memory 1004 may be used to store program instructions for execution by one or more processors 1002. Memory 1004 may, in one example, be used by software or applications running on computing device 1000 to temporarily store information during program execution.

One or more storage devices 1008 may, in some examples, also include one or more computer-readable storage media. One or more storage devices 1008 may be configured to store larger amounts of information than memory 1004. One or more storage devices 1008 may further be configured for long-term storage of information. In some examples, one or more storage devices 1008 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 1000 may, in some examples, also include network interface 306. Computing device 1000 may, in one example, use network interface 306 to communicate with external devices via one or more networks. Network interface 506 may be a network interface card, such as an Ethernet card, an optical transceiver, a radio frequency transceiver, or any other type of device that can send and receive information. Other examples of such network interfaces may include Bluetooth, 5G and Wi-Fi radios in mobile computing devices as well as universal serial bus (USB). In some examples, computing device 1000 may the network interface 1006 to wirelessly communicate with an external device such as a server, mobile phone, or other networked computing device.

Computing device 1000 may, in one example, also include user interface 1010. User interface 1010 may be configured to receive input from a user (e.g., tactile, audio, or video feedback). User interface 1010 may include a touch-sensitive and/or a presence-sensitive screen or display, mouse, a keyboard, a voice responsive system, or any other type of device for detecting a command from a user. In some examples, user interface 1010 may include a touch-sensitive screen, mouse, keyboard, microphone, or camera.

User interface 1010 may also include, combined or separate from input devices, output devices. In this manner, user interface 1010 may be configured to provide output to a user using tactile, audio, or video stimuli. In one example, user interface 1010 may include a touch-sensitive screen or display, sound card, a video graphics adapter card, or any other type of device for converting a signal into an appropriate form understandable to humans or machines. In addition, user interface 1010 may include a speaker, a cathode ray tube (CRT) monitor, a liquid crystal display (LCD), or any other type of device that can generate intelligible output to a user.

Computing device 1000, in some examples, may include power source 1016, which may be a rechargeable battery and may provide power to computing device 1000. Power source 1016 may, in some examples, be a battery made from nickel-cadmium, lithium-ion, or other suitable material. In other examples, power source 1016 may be a power source capable of providing stored power or voltage from another power source.

In addition, computing device 1000 may include short-range wireless communication module 1012. Short-range wireless communication module 1012 may be active hardware that is configured to communicate with other short-range wireless communication modules. Examples of short-range wireless communication module 1012 may include an NFC module, an RFID module, and the like. In general, short-range wireless communication module 1012 may be configured to communicate wirelessly with other devices in physical proximity to short-range wireless communication module 1012 (e.g., less than approximately ten centimeters, or less than approximately four centimeters). In other examples, short-range wireless communication module 1012 may be replaced with an alternative short-range communication device configured to communicate with and receive data from other short-range communication devices. These alternative short-range communication devices may operate according to Bluetooth, Ultra-Wideband radio, or other similar protocols. In some examples, short-range wireless communication module 1012 may be an external hardware module that is coupled with computing device 1000 via a bus (such as via a Universal Serial Bus (USB) port). Short-range wireless communication module 1012, in some examples, may also include software which may, in some examples, be independent from operating system 1018, and which may, in some other examples, be a sub-routine of operating system 1018.

The computing device 1000, in some examples, may also include wireless communication module 1014. Wireless communication module 1014 may, in some examples, may be a device operable to exchange data with other wireless communication modules over short distances (e.g., less than or equal to ten meters). Examples of wireless communication module 1014 may include a Bluetooth module, a WiFi direct module, and the like.

Computing device 1000 may also include operating system 1018. Operating system 1018 may, in some examples, control the operation of components of computing device 1000. For example, operating system 1018 may, in one example, facilitate the interaction with one or more processors 1002, memory 1004, network interface 1006, one or more storage devices 1008, user interface 1010, short-range wireless communication module 1012, wireless communication module 1014, and power source 1016.

Any applications implemented within or executed by computing device 1000 may be implemented or contained within, operable by, executed by, and/or be operatively/communicatively coupled to components of computing device 1000 (e.g., one or more processors 1002, memory 1004, network interface 1006, one or more storage devices 1008, user interface 1010, short-range wireless communication module 1012, wireless communication module 1014, and/or power source 1016).

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A vehicle steer-by-wire system, comprising:
a steering torque sensor configured to sense a steering torque applied to a steering wheel;
a steering feedback actuator operably connected with the steering wheel, the steering feedback actuator configured to generate a torque for a steering feedback to the steering wheel,
a road wheel actuator operably connected with one or more road wheels through a rack, the road wheel actuator configured to generate a torque for rotating the one or more road wheels, and
a controller configured to calculate an angular velocity of the steering feedback provided to the steering wheel of the steer-by-wire system, which has no mechanical linkage between the steering wheel and the one or more road wheels, using a model of a hypothetical steering system that has a mechanical linkage between the steering wheel and the one or more road wheels and a motor operably coupled with the mechanical linkage, and control the steering feedback actuator of the steer-by-wire system, which has no mechanical linkage between the steering wheel and the one or more road wheels, based on the angular velocity of the steering wheel calculated based on the model of the hypothetical steering system that has the mechanical linkage between the steering wheel and the one or more road wheels and the motor operably coupled with the mechanical linkage,
wherein the controller calculates the angular velocity of the steering wheel of the steer-by-wire system by estimating a rack force and a torque of the motor of the model of the hypothetical steering system, and calculating the angular velocity of the steering wheel of the steer-by-wire system based on the rack force, the torque of the motor of the model of the hypothetical steering system, and the steering torque sensed by the steering torque sensor.

2. The vehicle steer-by-wire system of claim 1, wherein:
the hypothetical steering system that has the mechanical linkage between the steering wheel and the one or more road wheels and the motor operably coupled with the mechanical linkage is an Electric Power Steering (EPS) system, and
the controller is configured to calculate the angular velocity of the steering feedback, provided to the steering wheel of the steer-by-wire system, using a model of the EPS system.

3. The vehicle steer-by-wire system of claim 2, wherein the controller is further configured to:
calculate an equivalent inertia of the model of the EPS system and an equivalent damping of the model of the EPS system; and
calculate the angular velocity of the steering feedback provided to the steering wheel of the steer-by-wire system based on the equivalent moment of inertia of the model of the EPS system, the equivalent damping of the model of the EPS system, the rack force, the torque of the motor of the model of the EPS system, and the steering torque sensed by the steering torque sensor.

4. The vehicle steer-by-wire system of claim 2, wherein the controller is configured to calculate the angular velocity of the steering feedback provided to the steering wheel of the steer-by-wire system using the model of the EPS system according to an equation:

$$J_{eq}\ddot{\theta} + B_{eq}\dot{\theta} + T_{driver} + T_{friction} + T_{motor} * N_{motor} * \eta_{gear} = F_{rack} * \left(\frac{L_{rack}}{2\pi}\right) * \eta_{rack}$$

where $\theta$ is the angular velocity of the steering feedback provided to the steering wheel, $J_{eq}$ is an equivalent inertia of the model of the EPS system, $B_{eq}$ is an equivalent damping of the model of the EPS system, $T_{driver}$ is the steering torque applied to the steering wheel, $T_{friction}$ is an equivalent friction of the model the EPS system, $T_{motor}$ is the torque of the motor of the model of the EPS system, $N_{motor}$ is a gear ratio of a gear assembly associated with the motor of the model of the EPS system, $\eta_{gear}$ is a gear efficiency of the gear assembly associated with the motor of the model of the EPS system, $F_{rack}$ is the rack force, $L_{rack}$ is a gear ratio of a rack and a pinion, and $\eta_{gear}$ is a gear efficiency of the rack and the pinion.

5. The vehicle steer-by-wire system of claim 4, wherein the controller is configured to calculate the equivalent inertia of the model of the EPS system based on an inertia of the steering wheel, an inertia of the motor of the model of the EPS system, and an inertia of the rack.

6. The vehicle steer-by-wire system of claim 4, wherein the controller is configured to calculate the equivalent inertia of the model of the EPS system by using an equation:

$$J_{eq} = J_{sw} + J_{motor} * N_{motor}^2 + J_{rack} * \left(\frac{L_{rack}}{2\pi}\right)^2$$

where $J_{eq}$ is the equivalent inertia of the model of the EPS system, $J_{sw}$ is an inertia of the steering wheel, $J_{motor}$ is an inertia of the motor of the model of the EPS system, $N_{motor}$ is the gear ratio of the gear assembly associated with the motor of the model of the EPS system, $J_{rack}$ is an inertia of the rack, and Lack is the gear ratio of the rack and the pinion.

7. The vehicle steer-by-wire system of claim 4, wherein the controller is configured to calculate the equivalent damping of the model of the EPS system based on a damping of the steering wheel, a damping of the motor of the model of the EPS system, and a damping of the rack.

8. The vehicle steer-by-wire system of claim 4, wherein the controller is configured to calculate the equivalent damping of the model of the EPS system by using an equation:

$$B_{eq} = B_{sw} + B_{motor} * N_{motor}^2 + B_{rack} * \left(\frac{L_{rack}}{2\pi}\right)^2$$

where $B_{eq}$ is the equivalent damping of the model of the EPS system, $B_{sw}$ is a damping of the steering wheel, $B_{motor}$ is a damping of the motor of the model of the EPS system, $N_{motor}$ is the gear ratio of the gear assembly associated with the motor of the model of the EPS system, $B_{rack}$ is a damping of the rack, and $L_{rack}$ is the gear ratio of the rack and the pinion.

9. The vehicle steer-by-wire system of claim 4, wherein the equivalent friction of the model of the EPS system is one of constants, each constant corresponding to a respective direction of rotation of the steering wheel.

10. The vehicle steer-by-wire system of claim 2, wherein the controller is configured to calculate the torque of the motor of the model of the EPS system based on a current supplied to the motor.

11. A method for controlling a vehicle steer-by-wire system, comprising:
  sensing, by a steering torque sensor, a steering torque applied to a steering wheel;
  providing, by a steering feedback actuator operably connected with the steering wheel, a torque for a steering feedback to the steering wheel;
  generating, by a road wheel actuator operably connected with one or more road wheels through a rack, torque for rotating the one or more road wheels;
  calculating an angular velocity of the steering feedback provided to the steering wheel of the steer-by-wire system, which has no mechanical linkage between the steering wheel and the one or more road wheels, using a model of a hypothetical steering system that has a mechanical linkage between the steering wheel and the one or more road wheels and a motor operably coupled with the mechanical linkage, wherein the calculating of the angular velocity of the steering feedback provided to the steering wheel of the steer-by-wire system comprises estimating a rack force and a torque of the motor of the model of the hypothetical steering system, and calculating the angular velocity of the steering wheel of the steer-by-wire system based on the rack force, the torque of the motor of the model of the hypothetical steering system, and the steering torque sensed by the steering torque sensor; and
  controlling the steering feedback actuator of the steer-by-wire system, which has no mechanical linkage between the steering wheel and the one or more road wheels, based on the angular velocity of the steering wheel calculated based on the model of the hypothetical steering system that has the mechanical linkage between the steering wheel and the one or more road wheels and the motor operably coupled with the mechanical linkage.

12. The method for controlling the vehicle steer-by-wire system of claim 11, wherein:
  the hypothetical steering system that has the mechanical linkage between the steering wheel and the one or more road wheels and the motor operably coupled with the mechanical linkage is an Electric Power Steering (EPS) system, and
  the calculating of the angular velocity of the steering feedback provided to the steering wheel of the steer-by-wire system comprises calculating the angular velocity of the steering feedback, provided to the steering wheel of the steer-by-wire system, using a model of the EPS system.

13. The method for controlling the vehicle steer-by-wire system of claim 12, wherein the calculating of the angular velocity of the steering feedback provided to the steering wheel of the steer-by-wire system comprises:
  calculating an equivalent inertia of the model of the EPS system and an equivalent damping of the model the EPS system; and
  calculating the angular velocity of the steering feedback provided to the steering wheel based on the equivalent moment of inertia of the model of the EPS system, the equivalent damping of the model of the EPS system, the rack force, the torque of the motor of the model of the EPS system, and the steering torque sensed by the steering torque sensor.

14. The method for controlling the vehicle steer-by-wire system of claim 12, wherein the calculating of the angular velocity of the steering feedback provided to the steering wheel of the steer-by-wire system comprises calculating the angular velocity of the steering feedback provided to the steering wheel of the steer-by-wire system using the model of the EPS system according to an equation:

$$J_{eq}\ddot{\theta} + B_{eq}\dot{\theta} + T_{driver} + T_{friction} + T_{motor} * N_{motor} * \eta_{gear} = F_{rack} * \left(\frac{L_{rack}}{2\pi}\right) * \eta_{rack}$$

where θ is the angular velocity of the steering wheel, $J_{eq}$ is an equivalent inertia of the model of the EPS system, $B_{eq}$ is an equivalent damping of the model of the EPS system, $T_{driver}$ is the steering torque applied to the steering wheel, $T_{friction}$ is an equivalent friction of the model of the EPS system, $T_{motor}$ is the torque of the motor of the model of the EPS system, $N_{motor}$ is a gear ratio of a gear assembly associated with the motor of the model of the EPS system, $\eta_{gear}$ is a gear efficiency of the gear assembly associated with the motor of the model of the EPS system, $F_{rack}$ is the rack force, $L_{rack}$ is a gear ratio of a rack and a pinion, and $\eta_{gear}$ is a gear efficiency of the rack and the pinion.

15. The method for controlling the vehicle steer-by-wire system of claim 14, wherein the equivalent inertia of the model of the EPS system is calculated based on an inertia of the steering wheel, an inertia of the motor of the model of the EPS system, and an inertia of the rack.

16. The method for controlling the vehicle steer-by-wire system of claim 14, wherein the equivalent inertia of the model of the EPS system is calculated by using an equation:

$$J_{eq} = J_{sw} + J_{motor} * N_{motor}^2 + J_{rack} * \left(\frac{L_{rack}}{2\pi}\right)^2$$

where $J_{eg}$ is the equivalent inertia of the model of the EPS system, $J_{sw}$ is an inertia of the steering wheel, $J_{motor}$ is an inertia of the motor of the model of the EPS system, $N_{motor}$ is the gear ratio of the gear assembly associated with the motor of the model of the EPS system, $J_{rack}$ is an inertia of the rack, and $L_{rack}$ is the gear ratio of the rack and the pinion.

17. The method for controlling the vehicle steer-by-wire system of claim 14, wherein the equivalent damping of the model of the EPS system is calculated based on a damping of the steering wheel, a damping of the motor of the model of the EPS system, and a damping of the rack.

18. The method for controlling the vehicle steer-by-wire system of claim 14, wherein the equivalent damping of the model of the EPS system is calculated by using an equation:

$$B_{eq} = B_{sw} + B_{motor} * N_{motor}^2 + B_{rack} * \left(\frac{L_{rack}}{2\pi}\right)^2$$

where $B_{eg}$ is the equivalent damping of the model of the EPS system, $B_{sw}$ is a damping of the steering wheel, $B_{motor}$ is a damping of the motor of the model of the EPS system, $N_{motor}$ is the gear ratio of the gear assembly associated with the motor of the model of the EPS system, $B_{rack}$ is a damping of the rack, and $L_{rack}$ is the gear ratio of the rack and the pinion.

19. The method for controlling the vehicle steer-by-wire system of claim 14, wherein the equivalent friction of the model of the EPS system is one of constants, each constant corresponding to a respective direction of rotation of the steering wheel.

20. The method for controlling the vehicle steer-by-wire system of claim 12, further comprising calculating the torque of the motor of the model of the EPS system based on a current supplied to the motor of the model of the hypothetical steering system.

\* \* \* \* \*